United States Patent
Arends et al.

(10) Patent No.: US 12,501,913 B2
(45) Date of Patent: Dec. 23, 2025

(54) PROCESS FOR PREPARING A SPREAD

(71) Applicant: Flora Food Global Principal B.V., Amsterdam (NL)

(72) Inventors: Berend Jan Arends, Spijkenisse (NL); Christiaan Michaël Beindorff, Capelle aan den Ijssel (NL); Johannes Jozef Marie Janssen, Rotterdam (NL); Teunis de Man, Maassluis (NL); Marcel Stevens, Brasschaat (BE)

(73) Assignee: Flora Food Global Principal B.V., Amsterdam (NL)

( * ) Notice: Subject to any disclaimer, the term of this patent is extended or adjusted under 35 U.S.C. 154(b) by 664 days.

(21) Appl. No.: 15/025,701

(22) PCT Filed: Sep. 29, 2014

(86) PCT No.: PCT/EP2014/070776
§ 371 (c)(1),
(2) Date: Mar. 29, 2016

(87) PCT Pub. No.: WO2015/052026
PCT Pub. Date: Apr. 16, 2015

(65) Prior Publication Data
US 2016/0242429 A1 Aug. 25, 2016

(30) Foreign Application Priority Data

Oct. 11, 2013 (EP) ..................... 13188311

(51) Int. Cl.
*A23D 7/05* (2006.01)
*A23D 7/00* (2006.01)
*A23D 9/04* (2006.01)
*A23D 9/05* (2006.01)

(52) U.S. Cl.
CPC .............. *A23D 7/05* (2013.01); *A23D 7/001* (2013.01); *A23D 9/04* (2013.01); *A23D 9/05* (2013.01)

(58) Field of Classification Search
CPC . A23D 7/05; A23D 7/001; A23D 9/04; A23D 9/05
See application file for complete search history.

(56) References Cited

U.S. PATENT DOCUMENTS

| 4,844,620 A | * | 7/1989 | Lissant | .................. B01F 3/088 |
| | | | | 366/136 |
| 2005/0129833 A1 | * | 6/2005 | Kincaid | .................. A23P 30/40 |
| | | | | 426/631 |

FOREIGN PATENT DOCUMENTS

| EP | 1065938 B1 | 7/2002 |
| EP | 1865686 | 12/2007 |
| EP | 1865786 | 11/2011 |
| GB | 514828 | 11/1939 |
| WO | WO2004068959 | 8/2004 |

(Continued)

OTHER PUBLICATIONS

IPRP2 in PCTEP2014070776, Aug. 24, 2015.

(Continued)

*Primary Examiner* — Stephanie A Kohler
(74) *Attorney, Agent, or Firm* — ArentFox Schiff LLP

(57) ABSTRACT

A process for manufacturing an edible water-in-oil spread, which process has the advantages of the cool blending process for manufacturing spreads, with improved rework capabilities. This is achieved by combining a stirred tank with recirculation means.

20 Claims, 1 Drawing Sheet

(56) References Cited

FOREIGN PATENT DOCUMENTS

WO   WO2010069751   6/2010
WO   WO2010069752   6/2010

OTHER PUBLICATIONS

Margarines and Shortenings, Ullmanns Encyclopedia of Industrial Chemistry, 1990, pp. 156-158, vol. A16.
Search Report and Written Opinion in EP131883118, Feb. 25, 2014.
Search Report in PCTEP 2014070776, Jan. 20, 2015.
Written Opinion in PCTEP2014070776, Jan. 20, 2015.

* cited by examiner

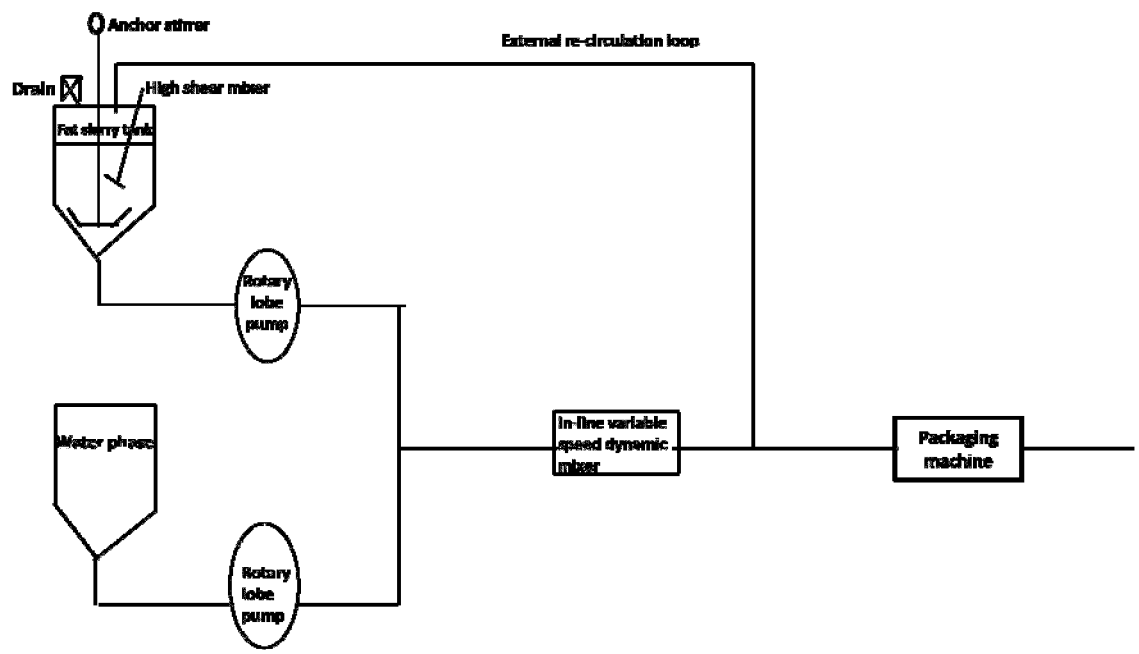

PROCESS FOR PREPARING A SPREAD

FIELD OF THE INVENTION

The present invention relates to a process for preparing a fat-continuous spread.

BACKGROUND OF THE INVENTION

Fat continuous food products are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase (being the case in for example a shortening as well as in a water in oil emulsion) and helps to stabilize the aqueous phase, if present, by forming a fat crystal network. For a margarine or spread, ideally the structuring fat has such properties that it melts or dissolves at mouth temperature. Otherwise the product may have a heavy and/or waxy mouthfeel.

Important aspects of a fat continuous spread like for example margarine and low fat spread, the low fat spread usually comprising up to 45 wt % fat on total composition, are for example hardness, spreadability and ability to withstand temperature cycling. Temperature cycling means that the product is subjected to low and high temperatures (e.g. when the consumer takes the product out of the refrigerator and leaves it for some time at the table prior to use). This may have a negative influence on the structure of the spread (like for example destabilization of the emulsion or oil-exudation).

Generally edible fat continuous food products like shortenings and margarines and similar edible fat continuous spreads are prepared according to prior art processes that encompass the following steps:
1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of these processes is that the complete composition (including the liquid oil, structuring fat and if present the aqueous phase) is subjected to a heating step and a cooling step. This requires a lot of energy. For a spread comprising for example 6 wt % structuring fat the whole composition (100 wt %) has to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids (SAFA) in the structuring agent is usually relatively high. Also trans fatty acid may be present. Some experts have called for reductions in these fatty acids to improve cardiovascular health. Some consumers prefer spreads that have a low energy density (for example products that are low in total fat) and/or are low in SAFA but still have a good nutritional profile (by providing for example essential fatty acids like omega-3 and omega-6).

A further disadvantage of the known processes is that the product may deteriorate due to the changes in temperature caused by the heating and cooling step.

Alternative processes have been described wherein the structuring fat is added as fat powder (i.e. crystallized fat) thereby eliminating the need to heat the whole composition to above the melting temperature of the structuring fat.

EP 1865786 discloses a process for the preparation of a spreadable edible dispersion wherein a mixture of oil and solid structuring agent particles is subjected to stirring and an aqueous phase is gradually added to the mixture until a dispersion is obtained. The solid structuring agent particles have a microporous structure of submicron size particles and can be prepared using a micronisation process. This process is known as the cool-blending process, as the ingredients are blended at ambient temperature. In such process, the aqueous phase and components of the fat phase (liquid oil and structuring agent particles) are prepared in batch portions which can be stored. Once the aqueous phase is added and the dispersion is obtained in the above process, the product is fed directly to the packaging line. The packing process is prone to interruptions, e.g. due to misalignment of tubs and lids. While this is solved by the operators one either has to store the ready dispersion in buffer tanks or stop the process and leave the ready dispersion standing in the line. In either case the subsequent use of this dispersion can give problems, because the consistency build-up will continue and may well lead to discarding of the dispersion to waste.

In conventional spread-making using scraped surface heat exchangers in which the whole emulsion is subjected to heating and cooling steps reworking is not a major problem, as any stored finished product has the same overall composition as the product to be fed in the scraped surface heat exchanger, so any stored product that could not be packed can be fed back to the pre-mix tank to be melted and mixed with the remainder of the emulsion, and fed from there to the scraped surface heat-exchanger. Re-working is fairly easy (within limits) as there is a buffer of the same overall composition (the pre-mix tank).

In the process of EP 1865686, however, there is no buffer thank with a product having the same overall composition. This is due to the fact that the aqueous phase and oil-phase are cool blended, directly to the final product. This means that any product which cannot directly be packed in such process is usually waste. This is as the stirrer in which the cool-blending process occurs can be stopped, but only for a short moment, as structure is building up. A too firm structure, and the whole product is stuck in the stirrer. Feeding back to the start of the stirrer is also not a good option, as there are differences in viscosity of the product fed to the stirrer and the product to be re-worked, resulting in inhomogeneous mixing. These are distinct disadvantages of an otherwise desired process.

WO 2010/069752 discloses a process for manufacturing spreads, in which (in the example) a slurry containing oil and fat powder is mixed with an aqueous phase at a junction point, after which junction point the aqueous phase and oil slurry are further mixed in a pin-stirrer.

SUMMARY OF THE INVENTION

Hence, there it is an object of the present invention to provide a process capable of manufacturing spreads on a factory scale, which process has the advantages of the cool blending process for manufacturing spreads, with improved re-work capabilities.

It has now been found that such may be obtained by a process for preparing an edible fat-continuous spread comprising 15-65% fat and 35-85% water, said process comprising the steps of:
- a) providing a fat powder;
- b) providing an aqueous phase;
- c) providing an oil phase;
- d) mixing said oil phase and said fat powder into a fat slurry in a stirred tank or recirculation means to which such stirred tank is connected;
- e) combining the aqueous phase with the fat slurry and/or pre-emulsion outside said stirred tank in the recirculation means, to form a pre-emulsion.

BRIEF DESCRIPTION OF THE DRAWINGS

FIG. 1 is a schematic drawing of a possible arrangement of the equipment.

DETAILED DESCRIPTION OF THE INVENTION

"Recirculation means" is herein to be understood as an assembly comprising a tube connected to an exit of a stirred tank (a first connection), which tube is connected to an inlet of said stirred tank (second connection), and which tube contains at least one inlet between said two connections to said stirred tank, through which inlet the aqueous phase may be added.

The process of the present invention is has the advantages of the cool blending process for manufacturing spreads, with improved re-work capabilities. This is achieved by combining a stirred tank with recirculation means. In other words, the process is characterized by the fact that at least part of the mixing of the aqueous phase and the slurry can be carried out between the stirred tank and the recirculation means. This is important as this is where the viscosity build-up takes place. Mixing the oil and the structuring powder is less critical.

The present process is preferably such that the overall composition in the stirred tank after all of the aqueous phase is added is the same as in the fat-continuous spread produced.

In the process according to this invention, it is preferred that the aqueous phase and the fat slurry and/or pre-emulsion outside said tank in the recirculation means are mixed by an in-line mixer, preferably by a dynamic mixer. Suitable in-line dynamic mixers are those that can supply sufficient shear to make a water-in-oil emulsion. If an inline mixer is present, it is preferably located is as part of the recirculation means. Even more preferably, the order in the recirculation means is, when coming from the stirred tank and following the recirculation flow:
exit of stirred tank
inlet of the aqueous phase
in-line mixer (preferably a dynamic mixer)
inlet to the stirred tank.

In the process according to this invention, it is preferred that the recirculation in step e), after all of the aqueous phase is added, is continued until at least no free water is detectable in the pre-emulsion. Detection of free-water can be done as is known in the industry of making W/O emulsions.

It is preferred, that in the process according to the present invention, the emulsion is fed to a packaging line from the stirred tank or from the recirculation means, when at its desired composition and when no free water is detected. Preferably, the emulsion can be fed from the recirculation means to a packaging line through a 3-way valve (e.g. two parts connected to the recirculation means, one part to the packaging line).

In the process according to this invention, it is preferred, for breaking up part of the fat powder to smaller particles, that prior to all of the aqueous phase having been added, at least part of the fat slurry or pre-emulsion is recirculated through the recirculation means.

As the process is a variant on the known cool blending technique of making spreads (see e.g. reference above), there is no need for heating the whole fat phase or even the whole emulsion, as is in the known votator processes. Even more, in order to retain the structuring properties of the structuring agent particles best, it is preferred that all process steps are carried out at a temperature of 0 to 40° C.

As mentioned, the process according to this invention is a variant of the known cool blending process for manufacturing spreads. This means that the structuring agent particles is a fat powder, preferably a micronized fat powder. The amount of fat powder in the total fat slurry made in the process according to the invention is preferably from 5 to 20% by weight, based on the total fat slurry. The same applies for the final product (preferably 5 to 20% by weight fat powder, based on the total fat slurry, which is mixed with the aqueous phase). In the products according to this invention, the amount of fat on the total composition in the stirred tank and in final product is preferably from 20 to 45%, based on the total composition.

The mixing in the stirred tank in step d) is carried out by an anchor stirrer and/or impeller.

EXAMPLES

Micronised fat powder was prepared of chemically interesterified fat blend of palm oil stearine fraction and palm kernel stearine fraction (identified as inES48), using the process as described in examples of WO 2010/069752. The weight fraction of the palm oil stearine was 65% and of the palm kernel stearine 35%. The melting point of the fat was 48° C.

In a closed, pressurisable tank (total volume 120 litres) equipped with:
an anchor stirrer,
a high shear disk mixer,
a recirculation loop containing an in-line variable speed dynamic mixer and
a cooling mantle 70 kg of a fat slurry was produced as described below. A schematic drawing and technical information of the used equipment is given in FIG. 1.
Description of drawing in FIG. 1:
1. Water phase
2. Fat slurry tank
3. High shear mixer
4. Anchor stirrer
5. Drain
6. Pump
7. In-line variable speed dynamic mixer 8. Re-circulation loop
9. Packing machine In the equipment as used and as FIG. 1, the various features have the following technical capacities:
- thermostated process vessel of 100 litre, usable volume from 35 to 100 litre,
- anchor stirrer (constant speed of 20 rpm; 0.75 kW),
- high shear disk mixer (maximum, speed 1000 rpm; 2.2 kW),
- external re-circulation loop with an in-line an in-line variable speed dynamic mixer (variable speed from 600 to 3000 rpm; maximum 11 kW power consumption),
- rotary lobe pump for circulation with a capacity of 3.0 m$^3$/hour, and single stage vacuum pump and pressure control.

The fat slurry was prepared by sucking 52.9 kg of rapeseed oil to the tank via a drain located at the lid of the vessel. The cooling mantle of the tank was switched on and the rape seed oil was cooled to the desired temperature of about 11° C. under constant stirring (12 rpm) of the anchor stirrer. A diluted monoglyceride solution in rape seed oil was prepared by melting 0.70 kg of Dimodan RT in 4.7 kg of warm rape seed oil (temperature 65° C.). The diluted monoglyceride solution was carefully added. The recirculation was set to 80%, high speed disc was set to 300 rpm and the dynamic mixer was set to 1250 rpm. 11.5 kg of the micronised fat powder was sucked in at an absolute pressure of 500 mbar in the head space of the vessel.

The fat slurry was prepared by sucking 52.9 kg of rapeseed oil to the tank via a drain located at the lid of the vessel. The cooling mantle of the tank was switched on and the rape seed oil was cooled to the desired temperature of about 11° C. under constant stirring (12 rpm) of the anchor stirrer. A diluted monoglyceride solution in rape seed oil was prepared by melting 0.70 kg of Dimodan RT in 4.7 kg of warm rape seed oil (temperature 65° C.). The diluted monoglyceride solution was carefully added. The recirculation was set to 80%, high speed disc was set to 300 rpm and the dynamic mixer was set to 1250 rpm. 11.5 kg of the micronised fat powder was sucked in at an absolute pressure of 500 mbar in the head space of the vessel.

To remove any incorporated carbon dioxide gas from the super critical melt micronised fat powder the absolute pressure stepwise lowered from 500 mbar to 100 mbar in 12 minutes time. During this treatment, both the dynamic and high shear mixers were running at 1500 rpm and recirculation was set at 80%. After the treatment all mixers were stopped and the tank was taken to ambient pressure. With only the anchor stirrer operation (20 rpm), 154 gram of a 1.0 wt % suspension of 3-carotene in sunflower and margarine flavour were added.

31 kg of the prepared fat slurry was carefully removed via the bottom drain and 39 kg was left in the vessel.

A waterphase was prepared consisting of 43 gram of sodium chloride and 99.6 litres of water. The pH of waterphase was adjusted with a 20 wt % solution of citric acid to a value of 4.80. The water phase temperature was approximately 15° C.

The in-line variable speed dynamic mixer (3000 rpm) and 80% of the circulation capacity of the lobe pump of the tank, were both started and 61 kg of waterphase was carefully added in portions of 5 litres each via the feeding funnel, to form the pre-spread. When the tank was filled with approximately 75 kg of pre-spread (the emulsion containing all ingredients), also the high shear disk mixer was switched on at 1400 rpm. Circulation and mixing were continued until all of the waterphase was added to the spread. During the addition of the waterphase special attention was paid to the fact that the temperature of the pre-spread remained below 23° C. otherwise too many fat crystals could melt. When all of the volume of waterphase was added both a visible inspection and with a WATOR paper (analytical test paper determination of free water in margarine) the presence of free water was investigated. Circulation and mixing were continued until no free water could be determined using this method. At that moment, via the bottom port the spread was pumped out of the tank. The prepared spread was put in 250 ml tubs and stored in a cold room (5° C.) until analysis. The spreads so-prepared performed well on the usual criteria.

The invention claimed is:

1. A process for preparing an edible fat-continuous spread comprising 15-65% fat and 35-85% water, said process comprising the steps of:
   a) providing a fat powder, an aqueous phase, and an oil phase;
   b) mixing said oil phase and said fat powder to form a fat slurry in a tank or recirculation means to which such tank is connected, and treating the resulting fat slurry by applying a stepwise reduction in absolute pressure from 500 mbar to 100 mbar, over a period of up to 12 minutes, while recirculating the fat slurry between the tank and the recirculation means;
   c) combining the aqueous phase with the fat slurry outside said tank in the recirculation means, to form a pre-emulsion; and
   d) forming the edible fat-continuous spread by recirculating the pre-emulsion at least once between the tank and the recirculation means;
   wherein steps c) and d) are performed at a temperature below 23° C.

2. The process of claim 1, wherein the aqueous phase and the fat slurry are mixed by an in-line dynamic mixer outside said tank in the recirculation means.

3. The process of claim 1, wherein recirculation is continued after all of the aqueous phase is added until at least a point wherein no free water is detectable in the pre-emulsion.

4. The process of claim 1, further comprising:
   e) directing the edible fat-continuous spread to a packaging process at a stage wherein no free water is detectable.

5. The process of claim 1, wherein prior to all of the aqueous phase having been combined in step c), at least part of the fat slurry or pre-emulsion is recirculated through the recirculation means.

6. The process of claim 1, wherein the provided aqueous phase has a pH of 4.8.

7. The process of claim 1, wherein the fat powder is a micronised fat powder.

8. The process of claim 1, wherein the amount fat powder in the total fat slurry is from 5 to 20% by weight, based on the total fat slurry.

9. The process of claim 1, wherein the amount of fat in the total composition in the tank and final product are from 20 to 45%, based on the total composition.

10. The process of claim 1, wherein the mixing in step b) in the tank or recirculation means to which such tank is connected, is carried out by an anchor stirrer and/or an impeller.

11. The process of claim 1, wherein the overall composition in the tank after all of the aqueous phase is added is the same as in the edible fat-continuous spread formed in step d).

12. The process of claim 1, wherein the provided aqueous phase has a temperature of approximately 15° C. when combined with the fat slurry at step c).

13. The process of claim 1, wherein the provided aqueous phase has a temperature of approximately 15° C. and a pH of 4.8 when combined with the fat slurry at step c).

14. The process of claim 1, wherein mixing said oil phase and said fat powder at step b) further comprises contacting the oil phase at a temperature of approximately 11° C. with the fat powder, and wherein the fat powder is initially provided to the tank or recirculation means at an absolute pressure of 500 mbar.

15. The process of claim 1, wherein the recirculation means is an assembly comprising a tube connected from an exit of the tank to an inlet of the tank, with an intervening connection to an inlet configured to provide the aqueous phase.

16. The process of claim 1, wherein the tank or the recirculation means is further connected to a packaging line.

17. The process of claim 1, further comprising step e) transporting the edible fat-continuous spread from the recirculation means to a packaging line through a 3-way valve.

18. The process of claim 17, wherein the 3-way valve comprises two ports connected to the recirculation means, and one port connected to the packaging line.

19. The process of claim 1, wherein the tank further comprises an anchor stirrer configured to operate at 20 RPM, and a high shear disk mixer; and the aqueous phase and the fat slurry are mixed by an in-line variable speed dynamic mixer configured to operate at from 600 to 3,000 RPM, outside said tank in the recirculation means.

20. The process of claim 1, wherein the recirculation means is configured to perform 80% recirculation during step d).

* * * * *